United States Patent [19]

Clark et al.

[11] 4,273,071
[45] Jun. 16, 1981

[54] CONTAINERS FOR TRANSPORTING POULTRY

[75] Inventors: Colin R. Clark, Shucknall; Arthur R. Shore, St. Weonards; Robert A. Corbett, Kinnersley, all of England

[73] Assignee: Sun Valley Poultry Limited, Hereford, England

[21] Appl. No.: 39,505

[22] Filed: May 16, 1979

[30] Foreign Application Priority Data

May 26, 1978 [GB] United Kingdom ............ 23261/78

[51] Int. Cl.$^3$ .......................................... A01K 31/07
[52] U.S. Cl. ........................................ 119/17; 119/12
[58] Field of Search ................... 119/17, 18, 15, 82, 119/12; 414/607, 608, 785

[56] References Cited

U.S. PATENT DOCUMENTS

| | | | |
|---|---|---|---|
| 553,902 | 2/1896 | Dickey | 119/17 |
| 1,347,397 | 7/1920 | Newman | 119/17 |
| 2,841,302 | 7/1958 | Reisman et al. | 414/608 |
| 3,279,432 | 10/1966 | Forstmair et al. | 119/15 |
| 3,812,822 | 5/1974 | Blankenship | 119/17 |
| 3,940,174 | 2/1976 | Mayes | 119/12 X |

FOREIGN PATENT DOCUMENTS

851566 10/1952 Fed. Rep. of Germany ............ 119/18
545155 6/1956 Italy ...................................... 119/18

Primary Examiner—Hugh R. Chamblee
Attorney, Agent, or Firm—Merriam, Marshall & Bicknell

[57] ABSTRACT

The invention concerns a container for handling small livestock, particularly poultry, in the transportation of the poultry from a poultryhouse to a central factory at which the poultry is processed. The container comprises a frame of openwork construction which supports several tiers of superposed drawers mounted for movement relative thereto between open and closed positions. The container comprises locking mechanism which is operative to lock all the drawers simultaneously. The container comprises a lifting formation which enables the container to be lifted by (for example) a modified forklift truck, and as a consequence of such lifting, the locking mechanism is automatically rendered operative. Desirably, the primary transporter (lorry or trailer) upon which the container is placed by the forklift truck is provided with a formation which is operative to retain the locking mechanism operative while the container rests on the lorry. The container forms part of a novel system for the transportation of poultry from geographically spaced buildings to a processing factory, at which the poultry is unloaded from the containers in a smooth and efficient manner.

5 Claims, 10 Drawing Figures

CONTAINERS FOR TRANSPORTING POULTRY

BACKGROUND OF THE INVENTION

This invention is concerned with improvements relating to containers, specifically for conveying small livestock, and systems of transportation, specifically of small livestock, from geographically spaced buildings in which the small livestock is housed, to a factory in which the livestock is to be processed. The invention has been devised particularly for use in relation to the handling of poultry such as chickens, turkeys and the like. It is however to be appreciated that the invention may be used to advantage in the handling of other small livestock.

Since the early 1950's, the intensive production of poultry has expanded considerably. For example in the U.K., approximately twenty five million chickens and probably one million turkeys were produced. The growth of the industry has resulted in the establishment of large processing plants capable of handling substantial numbers of poultry per week. Thus, whereas in the early 1950's a factory capable of killing twenty to thirty thousand chickens per week was considered large, today factories killing up to five hundred thousand chickens per week are in existence.

The development of such large processing units has made desirable the development of efficient means of transporting large numbers of live poultry. A traditional method of transporting all forms of poultry was to catch them in the building in which they were housed, and to carry them by hand to the nearest roadway where a vehicle awaited them. At the vehicle they were loaded into wooden crates through a small aperture at the top. A traditional crate was three feet long by two feet wide, and of a height appropriate to the species of poultry being carried. The crates were then stacked onto the vehicle and secured into position, and the vehicle travelled to the point of unloading. At the point of unloading the crates were unloaded by hand from the vehicle. The birds were then individually removed through the small top door of the crates, and hung on the poultry slaughterhouse processing lines.

This system is still widely used in the smaller poultry slaughterhouses, but is becoming increasingly unpopular for a number of reasons. Firstly it is necessary to carry the birds to the crates, which is a labour intensive operation. Secondly, it is necessary that the crates be carried to and loaded by hand onto the vehicle. This is physically demanding work and because of the violent movements which result (i.e. crates being dropped etc) the birds are subject to damage by bruising or broken limbs. Thirdly, it is difficult, to place the birds into and to remove them from the crates without damaging them as they pass through the top hatch. Fourthly, the crates have to be individually man-handled and then washed at the factory.

In the early 1960's, the larger processing plants started to develop alternative means of transport, the most commonly adopted method being to use a special vehicle on which the crates were fixed in position. It was therefore only necessary to carry the birds to the vehicle and place them in the crates through doors on the side of the vehicle. At the factory the birds were again removed from the crates through the same doors, and hung on the processing lines.

This system offered the advantage that it eliminated the individual handling of the crates both at the farm and the factory, and it made it possible to automate the cleaning of the total vehicle. However, it was still necessary to carry the birds by hand to the vehicle and to lift them up to the top crates on the vehicle, and at the factory it was necessary to have special facilities so that either the total vehicle was lowered or raised for unloading, or alternatively so that the processing line could be raised or lowered to the height of the vehicle. The birds were still also subject to damage during loading and unloading through the relatively small end apertures of the crates.

There is therefore a demand for a means which is appropriate to the handling of large numbers of live poultry, in reducing the amount of physical work involved in the handling of the live poultry, in improving the methods of handling so as to reduce the amount of damage sustained by the birds, and in providing improved working conditions for those involved in the various operations.

According to a first aspect of this invention there is provided a container for conveying small livestock, comprising an outer frame, a plurality of superposed drawers mounted within and supported by the frame for sliding movement relative thereto between open positions in which there is ready access to the interior of the drawers and closed positions, and locking mechanism whereby the drawers may be secured in their closed positions.

Preferably the frame is of open-work construction, to reduce the weight of the container. Advantageously the locking mechanism is operative to lock all the drawers simultaneously, reducing the likelihood of one drawer being left inadvertently unlocked, with possible adverse consequences during subsequent transportation.

The locking mechanism may be adapted for manual operation, but preferably the container comprises a lifting formation adapted to enable the container to be picked up by a transporter, such as a fork lift truck, the locking mechanism being associated with the lifting formation in a manner such that it is moved to lock all the drawers automatically by the picking up of the container by such a transporter.

In this manner, danger of one or more drawers being left unlocked, and inadvertently falling open during such transportation of the container, will be avoided.

The locking mechanism may be so moved by the transporter to a stable, locked position, which it retains until specifically unlocked. Thus, when the transporter places the container on a lorry or trailer, the locking mechanism will nonetheless remain in its locked position.

Advantageously however, the locking mechanism is biased to its unlocked position, and will normally be retained in its locked position by inter-engagement between said container and a part of the lorry or trailer upon which the container is placed.

The advantage of this is that, when subsequently the container is removed from the lorry by being lifted therefrom by another fork lift truck, the locking mechanism is retained in its locked condition throughout, until the container is set down by the fork lift truck (for example alongside a location at which the livestock is to be removed from the container) whereupon the drawers are automatically released for opening.

Where the containers are adapted to be stacked vertically on a lorry or trailer, each container is advantageously provided with a formation similar to the part provided on the lorry or trailer as aforesaid, whereby the locking mechanism of a superposed container will be retained in its locked position by engagement of the superposed container with the said formation provided on the container upon which it is superposed.

Advantageously however, over-riding mechanism is provided which is manually operable to release the locking mechanism, despite the locking mechanism being normally retained in its locked position by virtue of the position of the container on the lorry, or of the position of the container upon a similar container, as aforesaid. In this manner, should it be necessary to remove the livestock from the container whilst the container remains on the lorry, this may be carried out.

This invention also provides, in combination, a lorry and trailer, and a container of the kind set out in the last preceding paragraphs, the lorry comprising means operative normally to retain the locking mechanism in its locked condition when the container is placed thereon.

Preferably the container comprises two tiers of superposed drawers located side by side, the drawers of the two tiers being mounted for movement from their closed to their open positions in the same direction. Additionally or alternatively, the container comprises two tiers of superposed drawers located end to end, the drawers of these two tiers being mounted for movement from their closed to their open positions in opposite directions.

Preferably the locking mechanism is operative to lock the drawers of both tiers, or all four tiers, as the case may be in their closed positions simultaneously.

Preferably the drawers are so mounted as to be capable of separation from the frame: this is particularly useful since it allows the drawers to be separated from the frame, to be subjected to a washing operation.

This invention also provides a system of transporting small livestock such as poultry from buildings in geographically spaced locations housing the livestock to a factory in which the livestock is to be processed, involving the use of containers, each having a number of separately openable compartments, and in which: (a) a plurality of the containers are conveyed by a primary transporter to a position adjacent to a building housing the small livestock; (b) each container is conveyed from the primary transporter into or to the close vicinity of the building by the use of a secondary transporter; (c) a quantity of the small livestock is placed in the compartments of the container; (d) the container is then carried back to the said primary transporter or a similar primary transporter by the or a similar secondary transporter; (e) the containers are conveyed by said primary transporter to the factory in which the small livestock is to be processed; (f) each container is carried from the primary transporter to a position adjacent to or in the vicinity of a processing line by a tertiary transporter; (g) the livestock is removed from the container and placed on the processing line.

Preferably each container comprises a frame and a plurality of drawers, and subsequent to step (f), the drawers are removed from the frame and conveyed along a first flow path to an assembly station and the shell is conveyed along a second flow-path to the assembly station, at which the drawers and the frame are re-assembled.

Thus, the tertiary transporter may convey the containers from the primary transporter to an unloading platform, at which the drawers may be pushed out from the shell, conveniently automatically onto a moving conveyor belt which conveys the drawers along a first part of the first flow path in front of the personnel employed to empty the drawers. The personnel may then lift the poultry from the drawers and hang them on a processing line which passes in front of them over the open-topped drawers in one easy movement, in particular one which does not involve the personnel having to move bodily, for example turning through 180°. The empty drawers may then be conveyed along a second part of the first flow path through a washing station, at which the drawers are washed, and returned to be re-assembled with the frame or with the frame of a similar container, at the assembly station. The containers may then be returned to the or a similar transporter, to be conveyed in due course to another building housing small livestock.

Most advantageously the primary transporter is a lorry or trailer which may be attached to a lorry. However, it is envisaged that the primary transporter may be a railway wagon. Most conveniently the secondary transporter is a fork lift truck or modified fork lift truck or the like, as is the tertiary transporter.

By the use of this invention, a container may be delivered to or into a poultry house, the drawers opened, allowing ready access to the interior of the drawers through the open tops thereof, and the drawers loaded with poultry. The container may then be conveyed back to an awaiting lorry. In this manner, the amount of walking with the poultry required by the personnel involved in the operation is reduced, and damage to the poultry, either by dropping them into a large container, or by inserting them into a container through a relatively small opening, is reduced.

DETAILED DESCRIPTION OF THE PREFERRED EMBODIMENTS

The container 4 which is the preferred embodiment of this invention (FIG. 1) comprises a shell, constituted by a frame 6 of open-work construction (other than for a cover 7) which provides support for sixteen drawers 8 in four tiers of four drawers each, two tiers being arranged side by side and two tiers being arranged end to end. The container is of a size which allows it to be conveyed close to, and advantageously into, a building in which the poultry are housed. The frame 6 comprises a number of upright elements 12, secured to and extending between which are sixteen longitudinal struts 14. Each strut 14 carries, on an inner side thereof, a number of rollers 16 which extend into longitudinal channels 22 provided in the side faces of the drawers, (see FIGS. 3 and 4). Extending within the channels 22 on the inner sides of the drawers are members 23, so arranged as to reduce the height of the channels over a majority, central part of their lengths (best seen in FIGS. 4 and 5). The drawers may thus be moved on the rollers relative to the frame between open positions in which there is ready access to the interior of the drawer through the open top thereof, and closed positions.

The upright elements include four foremost elements 12a, 12b, 12c, and 12d and a bridge piece 24 (FIG. 1) extends between the elements 12b and 12c at upper regions thereof, a slot 26 of inverted "U" shape extending into a lower portion of the bridge piece.

Figure 6:
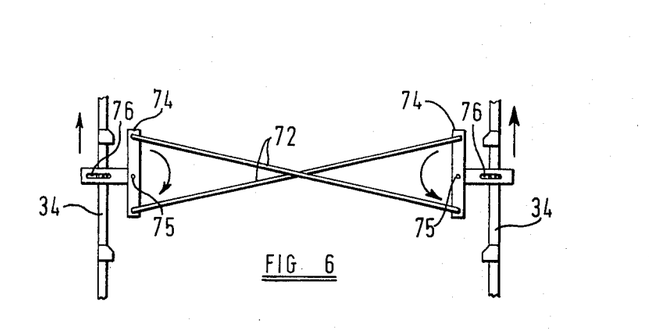
FIG. 6 is a schematic side elevation illustrating the inter-linkage between the forward and rearward locking devices of the locking mechanism.

The container comprises locking mechanism operative to lock and unlock all sixteen drawers simultaneously, said locking mechanism comprising two locking devices, one at a forward end of the container and which operates in relation to the eight drawers at said foremost end, and one at a rearward end and which operates in relation to the eight drawers at said rearmost, end linkage mechanism (shown in FIG. 6) being provided to ensure simultaneous operation of both said devices.

Figure 2:
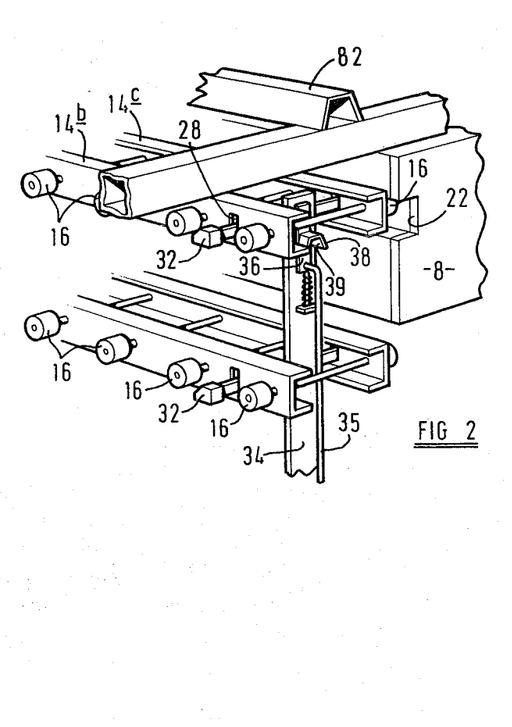
FIG. 2 is a scrap perspective view of said container, illustrating the locking mechanism at the forward end of the container.
Figure 3:
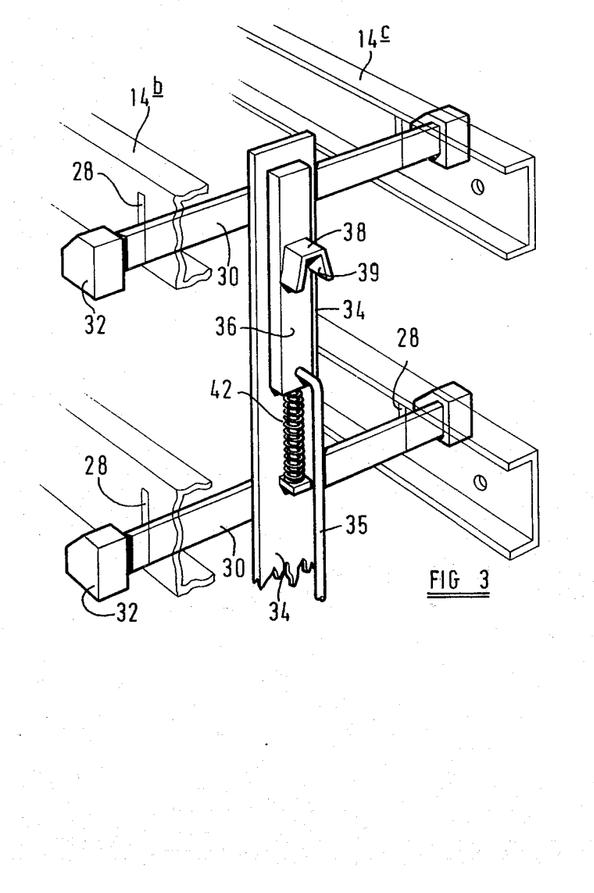
FIG. 3 is an enlarged view taken on FIG. 2, parts having been omitted for clarity of illustration.
Figure 4:
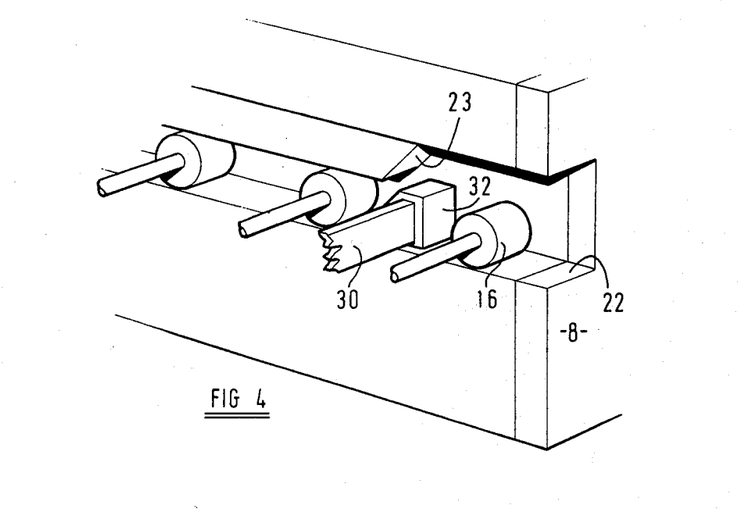
FIGS. 4 and 5 are schematic views illustrating the effect of locking blocks of the locking mechanism on movement thereof from its unlocked to its locked condition.

Provided in the eight struts 14 which extend from the foremost upright elements 12b and 12c (denoted in the drawings for convenience as 14b and 14c respectively) and at each end thereof is a slot 28 (FIGS. 2 and 3). Extending through the slots 28 of each pair of struts 14b, 14c is a cross piece 30 which is incorporate at its outer ends, with two locking blocks 32. The depth of each cross piece in relation to the depth of the two slots with which it is mounted is such as to allow limited vertical movement of the cross-piece 30, effectively to move the locking blocks between the position illustrated in FIG. 4 and the position illustrated in FIG. 5.

The four cross-pieces at each end of the container are secured to a vertical bar 34, which for convenience may be supported in slots (not shown) in the framework, allowing the vertical bar 34, and hence the four cross-pieces to be moved vertically in unison.

Mounted on a front face of the bar 34, for limited sliding movement relative thereto, is a slide bar 36, to an outer face of which is secured an engagement element 38, providing a downwardly-facing recess 39 of inverted U-shape. A spring 42 acting between the bar 34 and slide bar 36 urges the bar 34 into a higher position into engagement with a stop (not shown).

Figure 9:
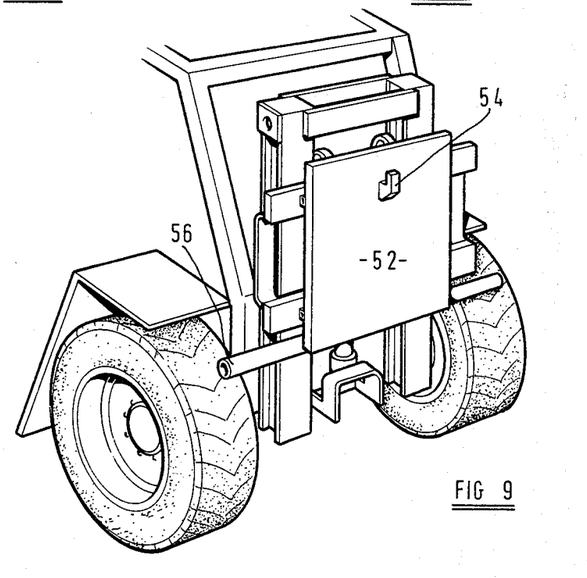
FIG. 9 is a front perspective view of a fork lift truck, modified for use in conjunction with the container.

The container which is the preferred embodiment of this invention is adapted to be lifted and transported by a modified fork lift truck (see FIG. 9). This modified fork lift truck is provided at the front thereof, with a mounting plate 52 on which there is located an upwardly directed hooked member 54, and a cylindrical support bar 56 beneath the mounting plate, the length of the support bar 56 being slightly greater than the width of the container.

In the use of the fork lift truck to lift the container, the truck is driven towards the container so that the hooked member 54 enters the space between the two upright elements 12b and 12c somewhat below the bridge piece 24. The mounting plate abuts against the foremost upright elements, and the support bar 56 engages bearing blocks 44 secured to the foremost upright elements. The fork lift truck is then slowly lifted, and the hooked member 54 moves behind the bridge piece 24, allowing the container as a whole to be lifted by truck.

However, prior to such engagement of the bridge piece 24 by the hooked member 54, said hooked seats in the recess 39 of the engagement element 38, lifting the slide bar 36 and, by virtue of the tension spring 42, lifting the vertical bar 34. The four cross pieces 30 are thus lifted simultaneously, moving within the slots 28 provided in the longitudinal struts, and when the locking blocks 32 are in the position shown in FIG. 5, any further upward movement of the engagement element 38 caused by the hooked member 54 merely stretches the tension spring 42. Subsequently the hooked member engages the bridge piece to lift the container.

Figure 5:
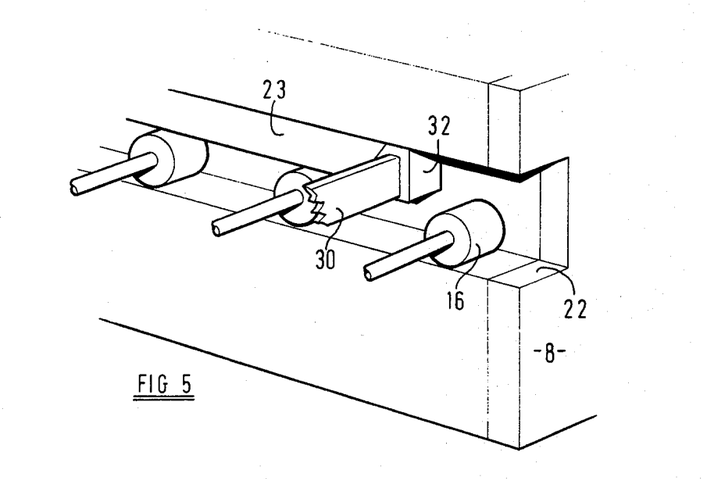

With the cross-piece 30 and the locking blocks 32 thereof in the positions shown in FIG. 5 of the drawings, movement of the eight drawers at the foremost end of the container from their closed towards their open positions is prevented by inter-engagement between the locking blocks 32 and the members 23 within the innermost of the channels 22. Thus, the bar 34, cross-pieces 30 and locking blocks 32 constitute a locking device which is operative, in consequence of the lifting of the container, by the fork lift truck, to prevent movement of the eight drawers at said forward end of the container from their closed to their open positions.

It will however be appreciated that when the fork lift truck is disengaged from the bridge piece 24 and engagement element 38, this locking device will be returned by gravity to its unlocked condition.

Figure 7:
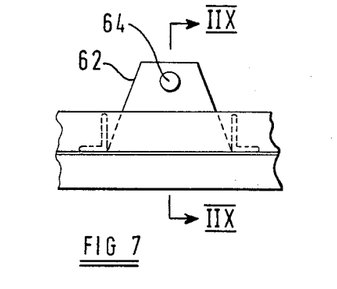
FIGS. 7 and 8 are respectively end elevation and side sectional views of an abutment of the lorry upon which the container seats, illustrating manual over-ride mechanism of the locking device.

However, the container which is the preferred embodiment of this invention is specifically designed for use in conjunction with a lorry or trailer which is provided, on the base thereof, with an abutment 62 of inverted V-shape (FIG. 7). In use, when the fork lift truck lowers the container onto the base of the lorry, the abutment 62 enters the central space between the rows of drawers, and a pin 65 carried by the abutment 62 (see FIG. 8) provides a stop which prevents downward movement of an extension piece 35 of the vertical bar 34 from its locking position. Thus, as the container is lowered onto the lorry, the abutment 62 takes over the function of retaining the locking device in its locked condition.

There is however provided, in association with the abutments 62, manually operable release means 64 which may be operated to allow the locking device to adopt the unlocked condition, despite the container being in its correct position on the lorry, should this be required (for example in the event that it is necessary to unload the drawers from the lorry by hand).

Figure 8:
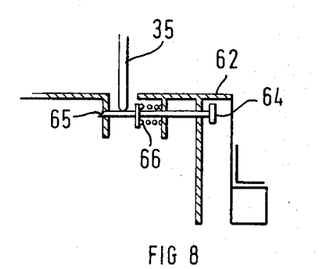

Thus, the extension 35 of the vertical bar 34 enters a recess in the abutment 62, and the pin 65, which is urged by a spring 66 into the position shown in FIG. 8, extends across the opening and restrains downward movement of the extension 35, as aforesaid. However, by grasping of a knob 64, the pin 65 may be retracted to release the locking bar for downward movement, and consequent movement of the locking device in its unlocked condition.

The locking mechanism to this point has merely been described in relation to eight drawers at the foremost end of the container, as illustrated in FIGS. 2 and 3. However, a similar combination of vertical bar 34, cross pieces 30 and locking blocks 32 is provided at the farmost end of the container. To enable this locking device to be operated simultaneously with the first described locking device there is provided a linkage mechanism (shown in FIG. 6) which is operative to transmit vertically upward, locking movement of the bar 34 at the foremost end of the container to the vertical bar 34 at the rearmost end of the container.

The linkage mechanism comprises two cross-rods 72, extending the full length of the container, and connected at their opposite ends to T pieces 74 each of which is mounted on a fixed pivot 75. The central arm of each T piece is provided with a slot 76, into which a pin extending horizontally from the bar 34 projects. Thus, as may be seen from FIG. 6, on upward movement of the bar 34 situated to the left hand side of the drawing, (this being the foremost vertical bar 34) the pin thereof which extends into the slot 76 will cause the left hand T piece 74 to pivot in a clockwise direction about its pivot pin, causing the two rods 74 to move in directions which cause the T piece 74 on the right hand side to pivot in an anti-clockwise direction about its pivot pin, producing similar vertical upward movement of the bar 34 on the right hand side.

Since the bar 34 of the locking device at the rearmost end of the container will similarly tend to fall under gravity to its lower, unlocked position, when the knob 68 at the foremost end of the container is operated to effect unlocking of the foremost locking device, the rearmost locking device will simultaneously adopt its unlocked condition.

Additional to the container comprising a locking device at the rearmost end, (comprising vertical bar 34, cross-pieces 30 and locking blocks 32) if desired said device provide the facility for lifting of the container from said rearmost end, such facility conveniently being provided by a further slide bar 36 and engagement element 38, and bridge piece 24.

However, since the two locking devices are interlinked an unlocking restraining element (being afforded by the extension 35 of the vertical bar 34, co-operative with the abutment 62) is provided at one end only of the container.

The container which is the preferred embodiment of this invention is adapted to be stacked vertically on top of another, similar container. Thus, on the top of the container illustrated in FIG. 1, there is provided an abutment 82, which is similar in construction and operation to the abutment 62 provided on the base of the lorry. Thus, if two or more containers are mounted one on top of the other, the locking mechanism of the upper container will automatically be retained in its locked condition by virtue of the abutment 82 of the container upon which it is superposed, said abutment 82 however similarly being provided with release mechanism which may be manually operated to allow the locking mechanism of said uppermost container to be released, should this be desired.

Thus, in the use of the container above described, whilst the container is elevated by the fork lift truck, and on the lorry, trailer or similar primary transporter, the drawers will be retained in their locked positions. However, when the container has been placed on the floor of the poultry house, or on the unloading platform at the processing factory, the drawers may easily be opened and closed for the unloading of poultry through the open tops of the drawers. Conveniently each drawer is approximately 48"×32"×11". Thus, between 20 and 30 birds may be held in each drawer, and since the container comprises 16 drawers, between 320 and 480 birds may be transported in each container. A lorry and trailer may carry up to 16 containers allowing a total load of up to 7680 birds to be carried by each such lorry and trailer.

The poultry transport system which is the preferred embodiment of this invention most advantageously involves the use of the container which is itself the preferred embodiment of this invention. It will be appreciated that, in operating the system, various modifications may be applied to the container, without departing from the principles of the system itself.

Figure 1:
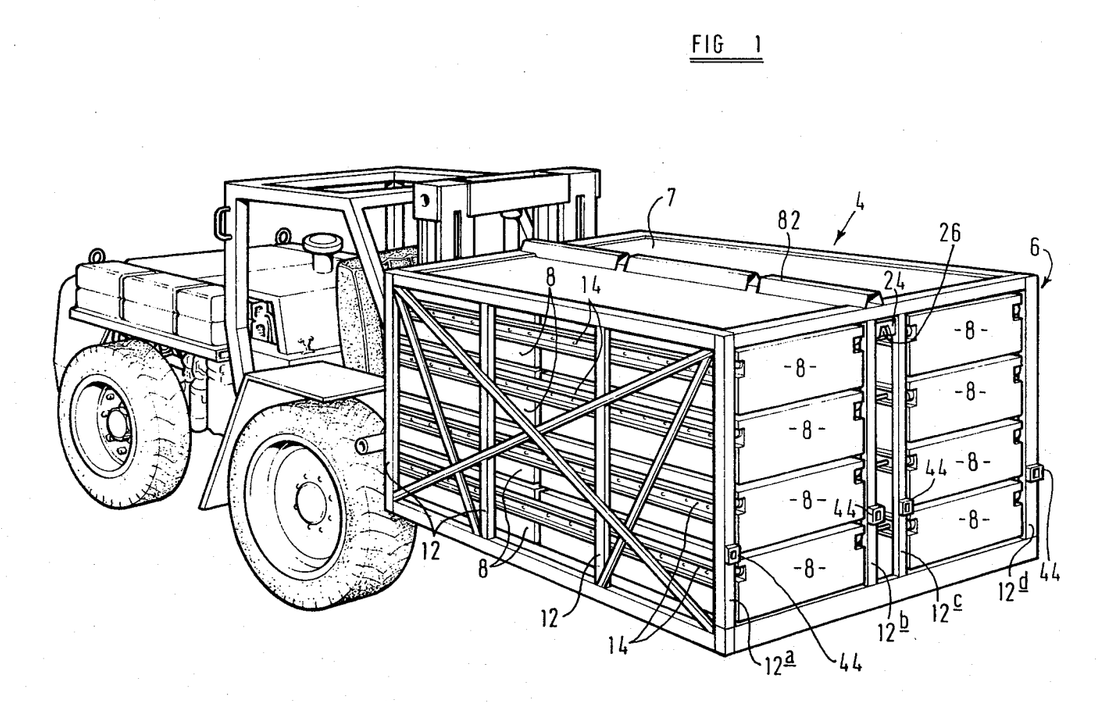
FIG. 1 is a schematic perspective view of a container which is the preferred embodiment of this invention, part of locking mechanism thereof having been omitted for clarity, the container being shown lifted by a fork-lift truck.

As is schematically illustrated in FIG. 1, a lorry with a number of such containers stacked thereon will travel to a poultry house, the containers being unloaded from the lorry by a modified fork lift truck, and conveyed to or into the poultry house. Upon setting the container down on the floor of the poultry house, the locking mechanism automatically adopts its unlocked condition.

The operators will then open the top most drawer, and load chickens therein. As each drawer is filled, the drawer will be closed, the cover 7 preventing exit of the poultry through the open top. The next drawer below will be opened, similarly filled, and closed, the base of the drawer above preventing exit of the poultry through the open top. When all the drawers of the container are filled with poultry, the fork lift truck will convey the loaded container back to the lorry, and deposit the container thereon, the locking mechanism being operated automatically to prevent accidental opening of the drawers by virtue of being so lifted by the fork lift truck, and being retained locked whilst residing on the lorry.

When the lorry is fully laden, it will convey the containers to the factory, at which the lorry will stop at a convenient place.

Figure 10:
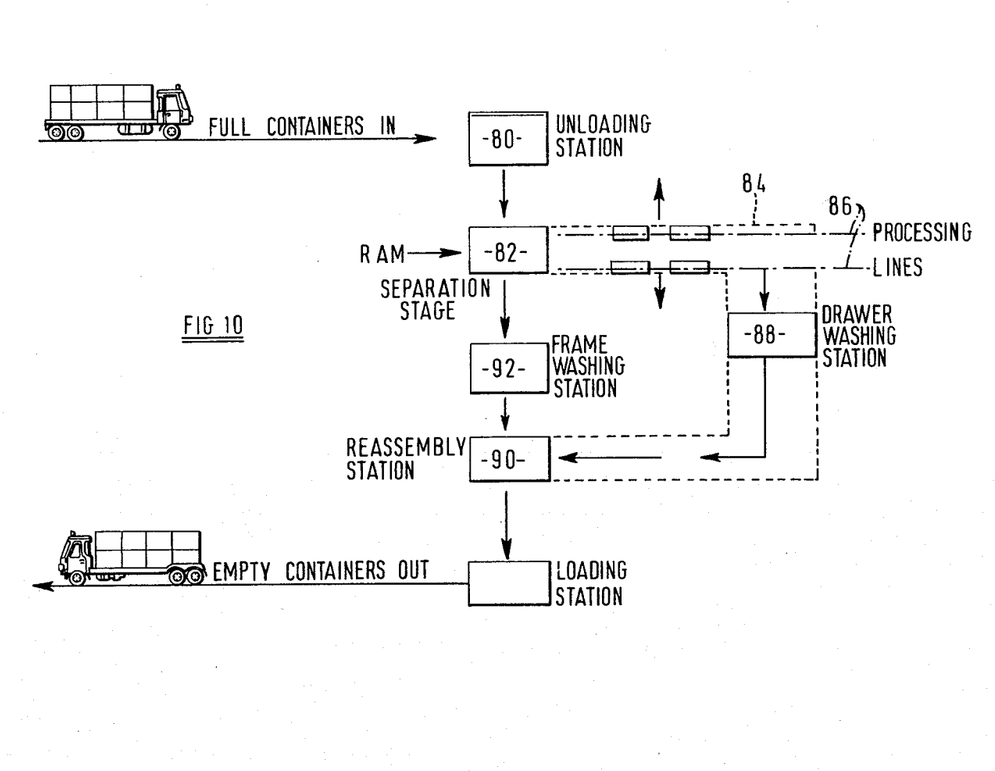
FIG. 10 is a schematic flow diagram illustrating part of the system of transportation of poultry which is itself an embodiment of this invention.

A similarly modified fork lift truck will lift the containers from the lorry, (retaining, whilst supporting the container, the locking mechanism locked) and deposit them at an unloading station (80 FIG. 10) at which the locking mechanism automatically adopts its unlocked condition. The containers are conveyed serially from the unloading station to a stage 82, at which the drawers are automatically pushed out of the frame onto a conveyor belt, constituting part of a first flow path 84. At this point, operatives standing alongside the conveyor belt lift the poultry from the drawers, and hang them on a processing line, indicated schematically 86. The drawers are then automatically fed along a further part of the flow path through a washing station 88, at which they are washed, and from which they are fed to an assembly station 90. The container shells have in the meantime been conveyed from the unloading station along a different flow path to a washing station 92, and hence to the assembly station 90. At the station 90, at which the drawers are reassembled with the shell of the same or a different container.

The empty container is then returned to the lorry, to await despatch to a further poultry collection point. By the use of the present invention the following advantages may be gained:

(1) At the farm, (a) there is a reduction in labour requirements due to the removal of the necessity for birds to be carried in small handfuls from the poultry house to the vehicle;

(b) there is a reduction in damage to the birds which are loaded into an open-topped container which is free from obstructions, such as narrow door openings;

(c) the working conditions for the personnel are generally improved in that they are not continuously walking from a warm poultry house into the prevailing ambient conditions.

(2) At the processing plant;

(a) the birds are removed from the open-topped container thereby sustaining less damage;

(b) the job of lifting poultry from the open-topped container to the processing line is physically less demanding to the improved relationship between the container and the processing line;

(c) because it is not necessary to move lorries and trailers into and out of the unloading area, it is possible to provide improved working conditions for those engaged in the operation there being only a small conveyor aperture into and out of the work area;

(d) it is no longer necessary for the personnel to reach into a container, often at the length of their arm.

It will of course be appreciated that each container may be provided, in addition to the locking mechanism which is retained operative by virtue of the mounting of the container on a lorry or trailer, or on a similar container, with additional, manually operable locking mechanism which acts as a safety device in the event of failure of the primary locking device.

We claim:

1. A container for transporting poultry from a poultry house to a processing plant, the container comprising:
a frame having opposed side walls each of which is provided with vertically-spaced mounting means, and a cover member extending between the side walls at upper parts thereof, a plurality of superposed drawers supported by the mounting means for movement between open and closed positions, and a locking mechanism carried by the frame and operable to secure the drawers in their closed positions,
wherein when the uppermost drawer is in its open position there is ready access to the interior thereof through the open top thereof and when the uppermost drawer is closed the open top thereof is closed by the cover member, and when each other drawer is in its open position, with the next drawer above it closed, there is ready access to its interior through the open top thereof and when each of the other drawers is closed, with the next drawer above it closed, the open top thereof is closed by the base of said next drawer above, and
wherein the locking mechanism is operative to lock all the drawers simultaneously, and the container comprises a lifting formation carried by the frame which is adapted to enable the container to be picked up by the transporter, the locking mechanism being associated with the lifting formation in a manner such that it is moved to lock all the drawers automatically by the picking up of the container by such a transporter.

2. A container according to claim 1 wherein the locking mechanism is biased to its unlocked position, and will normally be retained in its locked position by inter-engagement between said container and a part of a lorry or trailer upon which the container is placed, the locking mechanism of a superposed container being similarly retainer in its locked position by inter-engagement between said superposed container and a part of the container upon which it is superposed.

3. The invention according to claim 2, comprising override mechanism associated with said part which is manually operable to release the locking mechanism despite the locking mechanism being normally retained in its locked condition by virtue of the position of the container on the lorry or trailer, or of the position of the container on a similar container.

4. In combination, a lorry or trailer and a container according to claim 1, the lorry comprising means mounted thereon which is operative normally to retain the locking mechanism in its locked condition when the container is placed thereon.

5. The combination according to claim 4 wherein said means is effective to restrain relative movement between the lorry and the container, or between the container and a superposed container, as the case may be.

* * * * *